No. 876,414.
PATENTED JAN. 14, 1908.
W. P. TIPPIT.
ANIMAL TRAP.
APPLICATION FILED APR. 20, 1907.
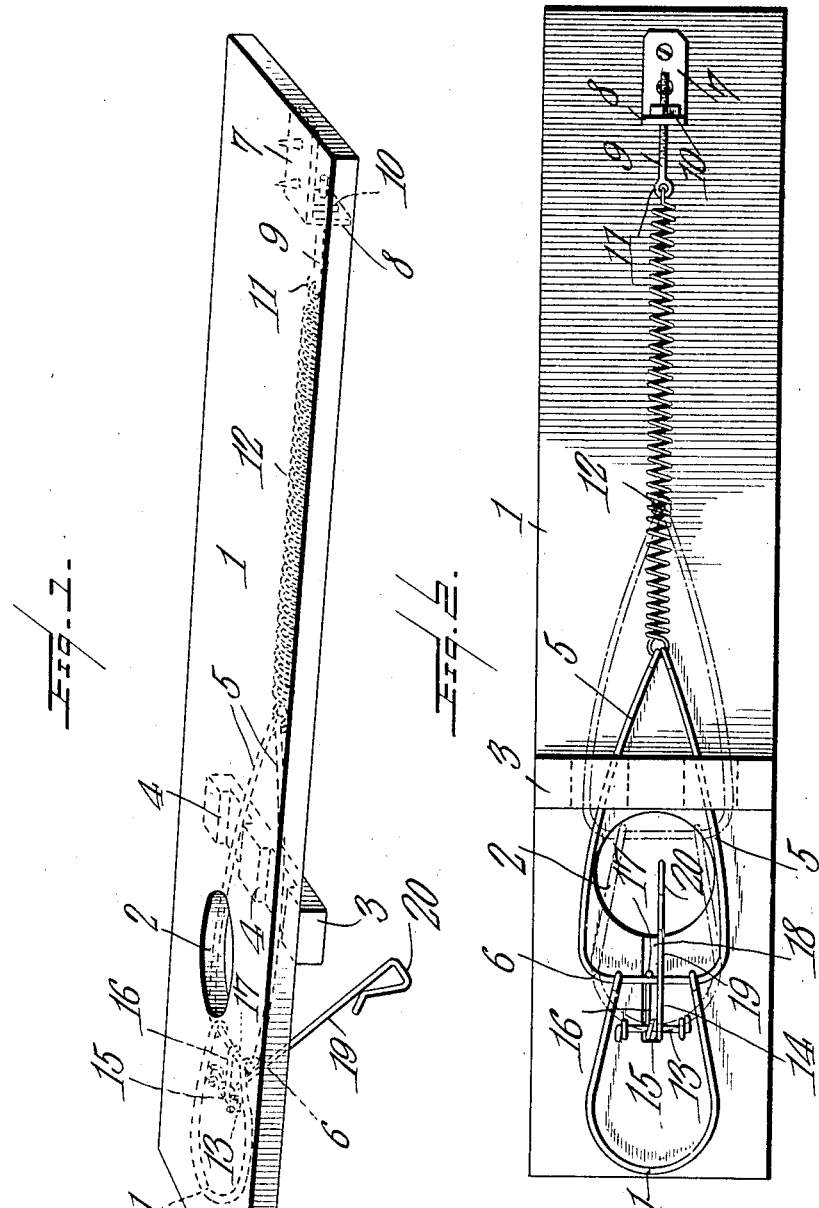
William P. Tippit,
INVENTOR
WITNESSES:
By C. A. Snow & Co.
Attorneys

UNITED STATES PATENT OFFICE.

WILLIAM P. TIPPIT, OF FAYETTE, MISSOURI.

ANIMAL-TRAP.

No. 876,414.     Specification of Letters Patent.     Patented Jan. 14, 1908.

Application filed April 20, 1907. Serial No. 369,315.

*To all whom it may concern:*

Be it known that I, WILLIAM P. TIPPIT, a citizen of the United States, residing at Fayette, in the county of Howard and State of Missouri, have invented a new and useful Animal-Trap, of which the following is a specification.

This invention relates to a trap for the capture of wild animals, raccoons, mink, opossum and all small fur bearing animals. Although the trap is intended primarily for the purpose noted it may also be used for domestic purposes in capturing and killing rats and mice.

The main object of the invention is to provide a trap that will lie flat on the ground or lean against the bank, in either position, hiding from view of the intended prey all mechanism.

A further object is to produce a trap that will not be affected by cold and exposure to storms which tend to cause other traps to become inoperative by ice and snow interfering with their operation.

Further objects of the invention not herein recited will be described more in detail hereinafter and pointed out in the claims.

In the accompanying drawings, Figure 1 is a perspective view of the trap placed flat on the ground and set for the capture of an animal. Fig. 2 is a bottom plan view of the trap shown set in full lines and tripped in dotted lines.

Similar numerals indicate the corresponding parts in all the figures.

The body or base of the trap consists of a board 1 of suitable length and width and heavy enough to prevent its being carried off by a trapped animal. Through the board near one end is a hole 2 for the passage of an animal's head in his desire to get at the bait on the other side of the trap. Fastened to one side of the base board which in the operation of the trap is the under side, and transversely thereof on the edge of the opening 2 in a bar 3 provided with grooves 4 preferably on the side next the base board and forming with said base board channels through which the side arms 5 of the strangulating loop 6 pass.

At the end of the base board farthest from the opening 2, is fastened a bracket 7 the outstanding arm 8 of which is perforated for a threaded bolt 9 to pass loosely therethrough, the bolt being retained in the perforation by a nut 10. The eye 11 of the bolt is fastened to one end of a coiled spring 12, the side arms 5 of the strangulating loop 6 being attached to the other end of said spring. On turning the nut 10 the spring is tensioned by the movement of the bolt 9 as is well understood.

Fastened to the base board 1 a short distance away from the opening 2 and on the side opposite the cross bar 3 is a transverse pivot pin 13 on which is fulcrumed the trigger mechanism 14 preferably formed of wire, and comprising the coil 15 pivoted on the pin 13, from one side of which coil an arm 16 projects towards the opening 2, lying close to the base board 1, and having its end turned outwardly to engage the strangulation loop when the trap is set To keep the strangulating loop close against the base board a groove 18 is made in said board for the catch 16. At the other end of the coil 15 the bait carrying arm 19 projects at an angle to and away from the base board but towards the opening 2 in the axis of which said arm terminates in a hook 20 or other means for holding bait.

For the purpose of easily and safely setting the trap, the bent wire 21 is attached by its ends to the strangulating loop 6 and passes around the trigger mechanism 14 as clearly represented in Fig. 2.

The operation of the trap will be readily understood from the foregoing description, it being sufficient to say that by pulling on the setting wire 21 to tension the spring 12, the strangulating coil will be brought over the catch 16 and caught behind its outwardly turned end 17, only to be released by an animal attempting to get the bait. The trap is placed in position flat on the ground with the mechanism underneath, a hole of sufficient size having been previously made for the trigger mechanism 14 to operate in, or the trap may lean against a bank after having removed sufficient earth for the proper working of the trigger mechanism. The top or exposed portion of the trap presenting a plain unbroken surface with the exception of the hole 2, there is nothing visible to excite the suspicion of the wariest wild animal and prevent it from seeking the bait by passing its head or foot through the opening 2.

Having thus described the invention what is claimed is:—

1. An animal trap comprising a base having an opening, a strangulating loop movable across said opening longitudinally of said base, an adjustable spring acting on said loop, and a tripping mechanism on the opposite side of said opening from the spring, said tripping mechanism comprising a pivot pin, an angular lever mounted on said pivot pin, one arm of said lever adapted to hold the strangulating loop when set while the other arm, inclined to the base board, is provided with a bait hook approximately in the axis of said opening but at an appreciable distance therefrom.

2. An animal trap comprising a base having an opening, a strangulating loop movable across said opening longitudinally of said base, an adjustable spring acting in a straight line on said loop, and a tripping mechanism on the side of said opening opposite said spring comprising a pivot pin fixed to the bottom of the base board, a coil of wire with two projecting arms pivoted on said pin, one of said arms lying close to said base board and provided with a catch for holding the strangulating loop, and the other arm extending away from said pivot pin at an angle to the base board and provided with a bait holder approximately in the axis of the opening In testimony that I claim the foregoing as my own, I have hereto affixed my signature in the presence of two witnesses.

WILLIAM P. TIPPIT.

Witnesses:
N. F. FRAZIER,
GEO. D. GIBSON.